United States Patent [19]

Rizk et al.

[11] 4,345,053

[45] Aug. 17, 1982

[54] SILICON-TERMINATED POLYURETHANE POLYMER

[75] Inventors: Sidky D. Rizk, Westfield; Harry W. S. Hsieh, Rahway; John J. Prendergast, Freehold, all of N.J.

[73] Assignee: Essex Chemical Corp., Clifton, N.J.

[21] Appl. No.: 284,195

[22] Filed: Jul. 17, 1981

[51] Int. Cl.³ ............................................. C08L 27/00
[52] U.S. Cl. ................................. 525/440; 525/443; 528/17; 528/18; 528/26; 528/28; 524/588
[58] Field of Search ............... 525/440, 453; 528/17, 528/18, 28, 26; 260/37 N; 524/588

[56] References Cited

U.S. PATENT DOCUMENTS

| | | | |
|---|---|---|---|
| 2,759,007 | 8/1956 | Dunham et al. | 260/448.2 |
| 3,208,972 | 9/1965 | Lyons | 260/46.5 |
| 3,494,951 | 2/1970 | Berger | 260/448.2 |
| 3,627,722 | 12/1971 | Seiter | 260/37 N |
| 3,632,557 | 1/1972 | Brode et al. | 260/77.5 TB |
| 3,703,499 | 11/1972 | Lindemann | 260/77.5 AT |
| 3,821,218 | 6/1974 | Berger | 260/248 NS |
| 3,886,226 | 5/1975 | Asai et al. | 260/77.5 AM |
| 3,979,344 | 9/1976 | Bryant et al. | 260/18 TN |
| 4,146,585 | 3/1979 | Ward et al. | 260/827 |
| 4,222,925 | 9/1980 | Bryant et al. | 260/37 N |

*Primary Examiner*—Melvyn I. Marquis
*Attorney, Agent, or Firm*—Curtis, Morris & Safford

[57] ABSTRACT

What are disclosed are the method of making a moisture-curable silicon terminated organic polymer which comprises reacting a polyurethane prepolymer having terminal active hydrogen atoms with an isocyanato organosilane having at least one hydrolyzable alkoxy group bonded to silicon, silicon terminated organic polymers so produced, and moisture-curable sealant compositions comprising such a silicon terminated polymer.

25 Claims, No Drawings

SILICON-TERMINATED POLYURETHANE POLYMER

The present invention relates to moisture-curable silicon terminated organic polymers, to methods of making the same, and to moisture-curable sealant compositions comprising such moisture-curable polymers.

U.S. Pat. No. 3,632,557 granted Jan. 4, 1972 to Brode et al. teaches silicon terminated organic polymers which are curable at room temperature in the presence of moisture. The patent teaches that such polymers, particularly after the inclusion therein of fillers which are conventional for incorporation into elastomeric compositions, can be used for coating, caulking, and sealing.

Indeed, U.S. Pat. No. 3,979,344 granted Sept. 7, 1976 to Bryant et al. and U.S. Pat. No. 4,222,925 granted Sept. 16, 1980 to Bryant et al. teach sealant compositions, curable at room temperature in the presence of moisture, comprising the organosilicon polymers of the Brode et al. patent in combination with specific additive materials. Thus, the first of the Bryant et al. patents teaches the addition of N-(beta-aminoethyl)-gamma-aminopropyltrimethoxy silane to a sealant composition containing such a silicon terminated organic polymer and the second of the aforementioned Bryant patents relates to the inclusion of a particular carbon black filler in such compositions. These patents teach the utility of the silicon terminated organic polymers, or of sealant compositions containing the same, for forming tenacious bonds to non-porous surfaces, particularly glass.

The silicon terminated organic polymers of the present invention are similarly moisture-curable at room temperature and can similarly be formulated into sealant compositions comprising fillers and other additives. As do the prior art materials, the polymers and compositions of the present invention show particularly good adhesion to non-porous surfaces such as glass and are particularly characterized by a very rapid cure rate which facilitates the use of the polymers and sealant compositions compounded therewith in industrial applications, for example as sealants for automotive glass such as windshields.

The silicon terminated organic polymers of the Brode et al. patent are prepared by reacting a polyurethane prepolymer having terminal isocyanate groups with a silicon compound containing alkoxysilane groups and having a mercapto group or a primary or secondary amino group reactive with isocyanate groups. Upon reaction of the mercapto or amino group with the terminal isocyanate groups of the polyurethane prepolymer, a moisture curable polymer having terminal hydrolyzable alkoxysilane groups is formed. These terminal alkoxysilane groups, in the presence of atmospheric moisture, reacct to form siloxane (—Si—O—Si—) groups, possibly by way of intermediate silanol formation. The formation of the siloxane linkages not only crosslinks and cures the moisture-curable polymer, but also promotes adhesion of the polymer to non-porous surfaces such as glass surfaces, with which the hydrolyzable alkoxysilane groups form particularly tenacious bonds in the presence of atmospheric moisture.

According to the present invention, a polyurethane prepolymer is similarly reacted with an organosilane compound having one or more hydrolyzable alkoxysilane groups. However, according to the invention, the polyurethane prepolymer has terminal active hydrogen atoms, present in groups such as hydroxy groups, mercapto groups, or primary or secondary amino groups. These active hydrogen atoms are reacted with an isocyanate group present in the organosilane compound. As in the prior art, urethane, thiourethane, or urea groups are produced by the reaction, but the nature in which these linking groups bond the terminal alkoxysilane groups to the polyurethane prepolymer differs from that known in the prior art and accounts for the improved properties of the claimed polymers and sealants. By way of illustration, the Brode patent shows the reaction of a compound of the formula

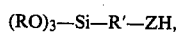
(RO)₃—Si—R′—ZH, where R is lower alkyl, R′ is a divalent bridging radical, and Z is S or NR″ where R″ is H or lower alkyl, with an isocyanato-terminated polyurethane polymer of the formula

OCN—[polyurethane polymer]—NCO

The reaction of the two compounds produces a polyurethane polymer having the following terminal group:

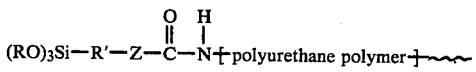
$$(RO)_3Si-R'-Z-\overset{O}{\overset{\|}{C}}-\overset{H}{\overset{|}{N}}-[\text{polyurethane polymer}]\sim\sim$$

In contrast, according to the present invention, an isocyanato terminated organosilane compound, for example

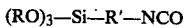
(RO)₃—Si—R′—NCO is reacted with a polyurethane prepolymer having active hydrogen terminals, e.g.

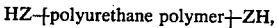
HZ—[polyurethane polymer]—ZH, where Z is O, S, or NR″ and R″ is H or lower alkyl, whereby a polymer terminal group of the structure

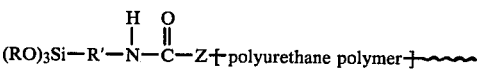
$$(RO)_3Si-R'-\overset{H}{\overset{|}{N}}-\overset{O}{\overset{\|}{C}}-Z-[\text{polyurethane polymer}]\sim\sim$$

is formed.

The Brode et al. patent teaches in detail the production of isocyanato terminated polyurethane polymers by the reaction of an organic polyisocyanate with a polyhydroxy compound. In the reaction, the polyisocyanate is employed in a molar excess so that the resultant polymers have isocyanate terminals. Exactly the same compounds and reagents may be used according to the present invention to form the prepolymers of interest, except that the hydroxy compounds are used in a molar excess with respect to the polyisocyanate so that the resulting reagents have hydroxy terminals. Exactly the same polyols may be employed as in the prior art, e.g. polyester polyols including lactone polyols prepared by the polymerization of lactones, particularly alkanolactones such as epsiloncaprolactone, compounds such as castor oil, and particularly, polyether polyols. The polyether polyols may be prepared by forming alkylene oxide adducts of the polyester polyols and lactone polyols discussed immediately above, or by reaction of alkylene oxides with materials such as castor oil. However, the preferred polyether polyols are polyoxyalkylene polyols, e.g. polyoxyalkylene diols prepared, for example, by the homopolymerization or copolymerization of materials such as ethylene oxide and propylene oxide. Polyoxyalkylene triols, for example linear compounds having pendant hydroxy groups or having branched polyether chains, may be employed as starting compounds in admixture with diols.

Further suitable polyols are polyhydroxy polysulfide polymers of the formula $$HO-X-SS(Y-SS)_n-X-OH,$$

wherein X and Y are each divalent aliphatic groups and n has a value between 1 and 100.

Polyurethane prepolymers having terminal mercapto groups are obtained by an analogous reaction between a polyisocyanate and thio compounds analogous to the polyester and polyether compounds discussed immediately above. In similar fashion, polyurethane prepolymers having terminal amino groups are prepared by the condensation reaction of polyisocyanates with polyamines, e.g. diamines and triamines, having primary and/or secondary amino groups therein.

The use of prepolymers prepared from polyols is preferred according to the present invention. Such polyols, having two or more hydroxyl groups, generally have a molecular weight between 500 and 6000 and can be either polyester or polyether polyols, with the latter being preferred. The polyols or polyol mixtures used according to the invention generally have hydroxyl equivalent weights between 50 and 2000. Preferred polyoxyalkylene polyols, e.g. polyoxypropylene, have hydroxyl equivalent weights between 200 and 2000.

As mentioned earlier, a portion of the diols which are usually employed in the reaction with polyisocyanates can be replaced by a trol, leading to the formation of branched polyurethane prepolymers.

A further preferred embodiment according to the present invention is the replacement of some of the polyol compound or mixture of polyols with water. The water, on reaction with isocyanate, releases carbon dioxide and forms an amino group. The latter in turn reacts with further isocyanate groups to form urea groups. According to the present invention it has been found that the resulting prepolymers containing both urethane and urea groups have improved heat stability and weathering resistance. While the applicants do not wish to be bound by theory, it is possible that the synergistic presence of urea and urethane groups in the prepolymer lengthens the induction period which precedes the initiation of the degradation of polyurethane polymers by heat and weathering phenomena such as exposure to ultraviolet light.

In this embodiment, up to 25 percent of the equivalents of isocyanate-reactive OH groups contributed by the polyol may be replaced by an equal number of equivalents of water. Preferably, the polyol employed in this embodiment is an aliphatic polyol such as a polyoxyalkylene polyol.

The organic polyisocyanates employed according to the present invention for formation of the prepolymers having terminal active hydrogen atoms are those also used in the Brode et al. patent. That is, they are aliphatic, cycloaliphatic, araliphatic, or aromatic polyisocyanates, suitably di- and/or tri-isocyanates. Particularly preferred materials for use according to the present invention are 4,4-diphenylmethane diisocyanate having aromatic characteristics, the cycloaliphatic diisocyanate 3-isocyanatomethyl-3,5,5-trimethyl cyclohexyl isocyanate known as isophorone diisocyanate, and dicyclohexyl-4,4'-methane diisocyanate, commercially available under the tradename "Hylene W". Mixtures of two or more of these preferred materials are also preferred for use in the present invention.

The reaction of the polyurethane with a polyol, polythiol, or polyamine may be suitably carried out in the present of a catalyst. For the formation of urethanes, for example, the stannous salts of carboxylic acids, such as stannous octoate, stannous oleate, stannous acetate, and stannous laurate are known as such catalysts. Further, dialkyltin dicarboxylates such as dibutyltin dilaurate and dibutyltin diacetate are known in the art as urethane catalysts, as are tertiary amines and tin mercaptides. Still other catalytic materials are known to those skilled in the art. The amount of catalyst employed is generally between 0.005 and 5 percent by weight of the mixture catalyzed, depending on the nature of the isocyanate.

Suitable conditions for such reactions are well known in the art. For example, the ingredients are reacted at a temperature between 0° C. and 120° C., preferably between 25° C. and 90° C., until no further isocyanate can be detected by infrared analysis. The reactions are carried out under an inert atmosphere, such as a nitrogen blanket, and under anhydrous conditions.

The resultant prepolymers having terminal groups with active hydrogen atoms have molecular weights varying between 3000 and 18000. Preferred prepolymers having a molecular weight between 10,000 and 15,000 have a moderate viscosity which facilities their further reaction with the isocyanato organosilane compounds used to "cap" the prepolymers and which also facilitate the compounding of the final "capped" materials into sealant compositions.

The organosilane compounds which are reacted with the prepolymers discussed above have the formula $$OCN-R-Si(X)_m(R')_{(3-m)},$$

wherein R is a divalent organic group, R' is hydrogen or alkyl having 1 to 4 carbon atoms, for instance, X is a hydrolyzable alkoxy group having from 1 to 4 carbon atoms, for instance, and m is an integer from 1 to 3. Group R can have any of a wide variety of structures forming a stable bridge between the terminal isocyanate group and the alkoxysilane group. A number of structures for such isocyanato alkoxysilane compounds are illustrated, for example, in columns 4 and 5 of U.S. Pat. No. 4,146,585, incorporated herein by reference. Preferably, however, R is a lower alkyl group having at least 3 carbon atoms therein, and particularly preferred materials for use according to the present invention are gamma-isocyanatopropyl-triethoxy silane and gamma-isocyanatopropyl-trimethoxy silane.

When the polyurethane prepolymer having active terminal hydrogen atoms is reacted in an approximately stoichiometric amount with an isocyanato alkoxysilane like that described above, the isocyanate groups of the latter reagent react with an equivalent amount of terminal active hydrogen atoms of the prepolymer to form a stable prepolymer having terminal alkoxysilane groups. The number of alkoxysilane groups present in the system will determine the degree of crosslinking of the polymer when it is cured by exposure to moisture such as atmospheric moisture.

The reaction between the prepolymer and the isocyanato alkoxysilane is carried out under anhydrous conditions and preferably under an inert atmosphere, such as a nitrogen blanket, to prevent premature hydrolysis of the alkoxysilane groups. The reaction is suitably carried out between 0° C. and 150° C., preferably between 25° C. and 80° C., until isocyanate groups can no longer be detected by infrared analysis.

As mentioned earlier, on exposure to moisture, for example atmospheric moisture, the alkoxysilane groups will hydrolyze, possibly with intermediate formation of the corresponding silanol, and will eventually form siloxane (—Si—O—Si—) bonds which lead to curing and bonding of the material to a substrate such as glass.

The rate of hydrolysis of the alkoxysilane by moisture, and consequently the rate of crosslinking, is accelerated by the use of catalysts known to promote the condensation of silanols. These materials include metal salts, such as tin salts, of carboxylic acids, organosilicon titanates, alkyltitanates, and the like. Dibutyltin diacetate is a preferred catalyst according to the present invention and is preferably employed in an amount between 0.1 and 1 percent by weight of the polymer, preferably between 0.2 and 0.6 percent by weight. Accordingly, such catalysts are suitably present in sealant compositions comprising the polymer of the invention as a component therein.

It has further been found that the presence of a quaternary arylalkyl or aralkylalkyl ammonium compound, particularly a quaternary ammonium hydroxide such as benzyl trimethyl ammonium hydroxide, surprising and unexpectedly accelerates curing of the polymers of the present invention and such materials are suitably incorporated into sealant compositions comprising or consisting of the polymer of the invention. A rapid cure mechanism is of particular importance, for example, when quick adhesion of a composition containing the polymers of interest, such as a sealant composition, to parts to be assembled with the sealant is required. Such a rapid cure is an important factor, for example, during the assembly and mounting of glass windshields in the automotive industry.

For formulation in sealant compositions, the polymers of the present invention are combined with fillers and additives known in the prior art for use in elastomeric compositions. By the addition of such materials, physical properties such as viscosity, flow rate, sag, and the like can be modified. To prevent premature hydrolysis of the moisture-sensitive groups of the polymer, the fillers should be thoroughly dried before admixture therewith. Exemplary filler materials and additives include materials such as carbon black, titanium dioxide, clays, calcium carbonate, surface treated silicas, ultraviolet stabilizers, antioxidants, and the like. This list, however, is not comprehensive and is given merely as illustrative.

As mentioned earlier, a monomeric alkoxysilane, preferably a monomeric amino alkoxysilane, is suitably physically incorporated together with the polymer in sealant compositions of this type. On hydrolysis, the monomeric alkoxysilane functions as a further crosslinking agent between the polymer molecules and/or between the polymer molecules and a surface, such as a glass surface, onto which the sealant compositions may be applied. In particular, N-alkyl-aminoalkyl trialkoxy silane monomers are suitably optionally added as such supplementary crosslinking agents, particularly those compounds in which the alkyl groups are all lower alkyl groups having 1 to 4 carbon atoms. Particularly preferred crosslinking agents are N-(beta-aminoethyl), N'-(gamma-trimethoxysilyl propyl)-ethylene diamine of the formula

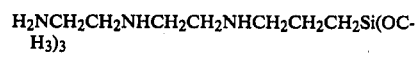

and N-(beta-aminoethyl)-gamma-aminopropyl trimethoxysilane of the formula

The latter is the same compound taught to be useful as an additive to sealants in U.S. Pat. No. 4,222,925 mentioned earlier herein.

As mentioned earlier, the presence of a quaternary ammonium compound, particularly of a quaternary ammonium hydroxide, greatly accelerates the cure rate of the polymers according to the present invention and sealant compositions containing the same. These accelerators are preferably present in the compositions in an amount between 0.1 and 5 percent by weight of the polymer being cured.

The use of quaternary ammonium compounds, including hydroxides, as catalysts for the curing of organopolysiloxane resins is known in the art. For example, U.S. Pat. No. 2,759,007 to Dunham et al. discloses the formation of low molecular weight polysiloxanes by the hydrolysis and condensation of, for example, dialkyl dialkoxy silanes. As disclosed in the patent, dialkylcyclosiloxanes comprising three to five monomer units make up a large portion of the resulting product. These oligomeric cyclic siloxanes are difficult to condense or polymerize into higher molecular weight materials. However, alkaline catalysts, including quaternary ammonium hydroxides, are taught to facilitate this reaction. The reaction, however, has no pertinence to the hydrolysis of alkoxysilanes initially to form polymeric organosilanes, possibly by way of an intermediate silanol.

U.S. Pat. No. 3,208,972 to Lyons discusses a method of making monomethylsiloxane by the hydrolysis of methyltrimethoxy silane or methyltriethoxysilane in the presence of an alkaline material, including quaternary ammonium hydroxides. However, the reaction is limited to hydrolysis of these monomers, is limited to the formation of a siloxane polymer comprising a repeating $CH_3SiO_{3/2}$ unit, and must be carried out in water. At least 6 mols of water per mol of the initial silane are necessary to produce the siloxane product in this patent.

A better understanding of the present invention and of its many advantages will be had by referring to the following specific Examples, given by way of illustration. In the following Examples, the polyether diol employed, unless otherwise indicated, is a polyoxypropylene diol having an average molecular weight of about 2,000 and commercially available under the tradename "Pluracol P 2010". Unless otherwise indicated, references in the Examples to a polyether triol are to a polyoxypropylene triol having an average molecular weight of about 4,000 and commercially available under the tradename "Pluracol TPE-4542." The triol is prepared by the polymerization of propylene oxide onto a trihydric starting material such as glycerine or trimethylol propane. Unless otherwise indicated, the isocyanatoalkoxy silane employed in the Examples is gamma-isocyanatopropyl triethoxysilane.

EXAMPLE 1

A silane-terminated prepolymer having a linear polyether structure is prepared by mixing thoroughly 343.5 g (0.343 equivalent) of polyether diol, 36.0 g (0.286 equivalent) of 4,4'-diphenylmethanediisocyanate, and 0.02 g of dibutyltin dilaurate as a catalyst in a reaction vessel in the presence of a very small quantity of a defoaming agent. Because of reaction of the isocyanate and hydroxyl groups, the temperature of the mixture may rise to as high as 45° C. during mixing. The temperature then is raised to 75° C. and maintained for about 3 hours until isocyanate can no longer be detected therein by infrared spectroscopy.

Thereafter, 14.1 g (0.057 equivalent) of isocyanatoalkoxy silane are added and the reaction temperature is again kept at 75° C. for about three hours until no isocyanate can be detected in the reaction mixture.

The prepolymer is then filled into a metal can container, degassed, flushed with nitrogen, and stored for further compounding.

EXAMPLE 2

A silane terminated prepolymer was synthesized by mixing thoroughly 389.2 g (0.77 equivalent) of a polyoxytetramethylene diol commercially available under the tradename "Polymeg 1000" (M.W.≈1000), 76.9 g (0.62 equivalent) of 4,4'-diphenylmethane diisocyanate, 57.4 g of toluene, and 0.02 g of dibutyltin dilaurate as a catalyst in a reaction vessel. The mixed ingredients were then heated at 75° C. for three hours or until isocyanate groups could no longer be detected in the reaction mixture. Finally 38.0 g (0.15 equivalent) of isocyanatoalkoxysilane were added. The mixture was again kept at 75° C. for six hours until NCO could not be detected by infrared analysis. The prepolymer was then emptied into a metal can container, degassed, flushed with nitrogen and stored.

EXAMPLE 3

A polymer containing a polyurethane backbone terminated with gamma-isocyanatopropyl trimethoxysilane, instead of gammaisocyanatopropyl triethoxysilane as in the previous examples, was prepared by thoroughly mixing 283.0 g (0.15 equivalent) of a polyether diol having an hydroxyl equivalent weight of 1840 and commercially available under the tradename "Olin Poly-G-55-30", 9.6 g (0.077 equivalent) of 4,4' diphenylmethane diisocyanate, and 0.02 g of dibutyl tin dilaurate as a catalyst and heating at 75° C. for three hours until no isocyanate absorption was observed in an infrared spectrum. Then 15.8 g (0.07 equivalent) of gamma-isocyanatopropyl trimethoxysilane were added and the whole mixture was again heated at 75° C. for five hours until isocyanate groups could no longer be detected by infrared analysis. The prepolymer was placed in a metal can container, degassed, flushed with nitrogen and stored for further compounding.

EXAMPLE 4

A silane terminated polyester prepolymer was prepared by mixing thoroughly 745.5 g (2.78 equivalents) of a polycaprolactone diol having an hydroxyl equivalent weight of 267 and commercially available under the tradename "PCP-0200", 322.4 g (2.55 equivalents) of 4,4' diphenylmethane diisocyanate, and 183.0 g of toluene in a reactor. The mixed ingredients were then heated at 75° C. for three hours until isocyanate groups could not be detected in the reaction mixture. Finally 57.5 g (0.23 equivalent) of gammaisocyanatoalkoxysilane were added. The mixture was once more kept at 75° C. for 8 hours until no isocyanate absorption could be observed in an infrared spectrum. The prepolymer was then emptied into a metal can container, degassed, flushed with nitrogen and stored.

EXAMPLE 5

A silane terminated branched polyether prepolymer was prepared by combining 12024 g (12 equivalents) of polyether diol and 1764 g (14 equivalents) of 4,4'-diphenylmethanediisocyanate in a reaction vessel together with 6036 grams of a mixed plasticizer comprising 310 grams of an alkylnaphthalene monomer and 5726 g of a $C_7$-$C_{11}$-dialkylphthalate. The combined ingredients were heated to 63° C., heating was terminated, and 4 g of triethylene diamine catalyst were added. The temperature of the reaction mixture was then brought to 75° C. and kept at this value for ten hours. The NCO content was found to be 0.42 percent, equal to the theoretical value. At this point, 9084 g (6 equivalents) of polyether triol and a further 14 g of triethylene diamine catalyst were added to the reaction mixture. A temperature of 55° C. was maintained for three hours, at which time no isocyanate could be detected by infrared spectroscopy.

Finally, 988 g (4 equivalents) of isocyanatoalkoxysilane and a further 4 g of triethylene diamine catalyst were added. The resulting mixture was brought to a temperature of 75°-80° C. and kept at this temperature for an additional three hours or until no isocyanate content was detectable.

The prepolymer was then filled into a metal can container, degassed, flushed with nitrogen, and stored.

EXAMPLE 6

A silane terminated branched polyether prepolymer was synthesized by combining 182.2 g (0.18 equivalent) of polyether diol, 26.7 g (0.21 equivalent) of 4,4'-diphenylmethane diisocyanate, and 91.5 g of a $C_7$-$C_{11}$-dialkyl phthalate in a reaction kettle together with 0.24 g of triethylene diamine as a catalyst and a small quantity of a defoaming agent. The reaction mixture was heated at 75° C. for about 8 hours. The NCO content was found to be 0.42 percent, equal to the theoretical value. Then 149.5 g (0.09 equivalent) of a polyether triol prepared from glycerine and propylene oxide, having an hydroxyl equivalent weight of 1644 and commercially available under the tradename "Pluracol 816," and 0.12 g of triethylene diamine catalyst were added to the reaction mixture. A temperature of 55° C. was maintained for three hours or until no isocyanate groups could be detected by infrared analysis. Finally, 15.0 g (0.06 equivalent) of gammaisocyanato-alkoxysilane was added. The whole mixture was heated to 75° C. and kept at this temperature for an additional 6 hours until no isocyanate content was detectable. The prepolymer was then emptied into a metal can container, degassed, flushed with nitrogen, and stored.

EXAMPLE 7

The following polymer has a linear polyether backbone and contains aliphatic urethane linkages together with urea groups.

416.6 g (3.75 equivalents) of isophorone diisocyanate were heated to 95° C. and then combined with 0.75 g of a surfactant, 0.08 g of dibutyltin dilaurate catalyst, and 0.02 g of triethylene diamine as a catalyst. After thorough mixing, 8.5 g (0.94 equivalent) of water were added dropwise to the mixture at a rate about one drop every ten seconds. During the addition of water, the temperature of the mixture was kept at 95° C.

When water addition was complete, heating was stopped and the reaction mixture was slowly cooled to room temperature with stirring. The product had an isocyanate content of 29.1 percent, compared with a theoretical value of 27.8 percent. (The high value of NCO may be due to loss of water during the reaction).

Based on the isocyanate content so determined, the number of equivalents of reaction mixture was calculated and 3606.5 g (3.51 equivalent) of polyether diol were added to provide a slight excess of hydroxy groups with respect to NCO. At the same time, 0.38 g of dibutyltin dilaurate catalyst were added to the mixture, which was then heated to 75° C. and maintained at this temperature for 8 hours until isocyanate could no longer be detected in the reaction mixture.

Finally, 172.9 g (0.70 equivalent) of isocyanatoalkoxysilane were added. The mixture was again kept at 75° C. for eight hours until NCO could no longer be detected.

The prepolymer was then filled into a metal can container, degassed, flushed with nitrogen, and stored for further compounding.

EXAMPLE 8

An alkoxysilane terminated polymer similar to that of Example 7 and comprising a linear polyether structure having both urea and aliphatic isocyanate groups therein was prepared by heating 1194.7 g (9.13 equivalents) of dicyclohexyl-4,4'-methane diisocyanate to 95° C. in a reaction vessel. 2.0 gram of a surfactant ("Igepal"), 0.2 g of dibutyltin dilaurate catalyst, and 0.5 g of triethylene diamine catalyst were added. Next, 10.4 g (1.13 equivalents) of water were added dropwise at the rate of about one drop every ten seconds. During the addition of water, the pot temperature was kept at 95° C. When addition was completed, heating was stopped and the reaction mixture was slowly cooled to room temperature with stirring. The resultant reaction product had an isocyanate content of 28.7 percent, from which the equivalent weight of the reaction mixture was calculated to be 146.4.

10108.1 g (10 equivalents) of polyether diol were added to the mixture together with 0.16 g of dibutyltin dilaurate catalyst. The mixture was heated to 75° C. and maintained at this temperature for 16 hours or until isocyanate could any longer be detected in the reaction mixture. Since the diol is used in slight excess, the resulting product is hydroxy terminated.

Now, 494.0 g (2 equivalents) of isocyanatoalkoxy silane and 0.16 g of anti-foaming agent were added and the mixture was again kept at 75° C. for a further six hours or until no isocyanate can be detected.

The resulting prepolymer was filled into a metal can container, degassed, flushed with nitrogen, sealed and stored for further compounding.

EXAMPLE 9

A polymer having a polyether structure comprising urea groups and aliphatic urethane groups therein and further comprising four ethoxysilane terminal groups per molecule was synthesized as follows.

An adduct containing urea groups was prepared by reacting isophorone diisocyanate and water in the presence of a surfactant, of dibutyltin dilaurate, and of triethylene diamine as earlier described in Example 7. 27.0 g (0.93 equivalent) of this adduct were then combined with 162.3 g (0.80 equivalent) of a polyether diol, 0.04 g of dibutyltin dilaurate catalyst, 0.02 g of an anti-foaming agent, 4.1 g of an alkylnaphthalene plasticizer, and 81.2 g of a $C_{17}$-$C_{11}$-dialkylphthalate plasticizer in a 500 ml reaction vessel, heated to 75° C., and kept at that temperature for three hours. The isocyanate content of the reaction mixture was determined to be 0.51 percent.

Now, 118.4 g (10.4 equivalents) of polyether triol were added together with an additional 0.04 g of dibutyltin dilaurate catalyst and the reaction mixture was again heated at 75° C. for three hours until no isocyanate could be detected in the mixture.

Finally, 13.2 g (0.27 equivalent) of isocyanatoalkoxysilane and 0.04 g of a dialkyltin dicarboxylate catalyst commercially available under the tradename "Formrez UL 28" were added and the mixture was once more heated at 75° C. for three hours until isocyanate could no longer be detected.

The reaction mixture was then filled into a metal can container under nitrogen and sealed for storage.

The following Examples relate to the use of the prepolymers prepared by the preceding Examples in the formulation of sealant compositions.

EXAMPLE 10

A sealant composition was prepared by combining 62.26 parts by weight of the prepolymer of Example 1 and 0.34 part of dibutyltin diacetate in a planetary mixer and mixing for 20 minutes under nitrogen to exclude moisture.

At this point, 2.83 parts of N-(beta-aminoethyl)-gamma-aminopropyl trimethoxysilane, 0.63 g of tris-(dimethylaminomethyl)phenol as an optional catalyst, 2.93 parts of xylene, and 1.57 parts of methanol were added and the new mixture was mixed for an additional 20 minutes. All of the ingredients added in this step were carefully dried to avoid the introduction of moisture into the composition.

Finally, 14.72 parts of dried carbon black and 14.72 parts of dried clay were added to the mixture, which was mixed for a further 20 minutes under a reduced pressure of 19 inches of mercury. The sealant compounded in this manner was filled into sealant tubes.

The resulting sealant contains only 4.5 percent by weight of solvent, so that shrinkage due to solvent evaporation after cure will not be more than 4.5 percent. The sealant does not sag. The cure rate for the sealant was 36.0 psi at 2.7 hours, determined by a quick adhesion test described immediately below.

For testing quick adhesion, a 4×¼ inch bead of sealant is extruded from a sealant tube onto a primed glass plate. Another primed glass plate is placed on top of the sealant bead. This assembly is sprayed with water and allowed to cure at room temperature for one hour, then immersed in a water bath at 77° F. for four minutes. The plates are then separated by pulling in a plane perpendicular to the plane of the bead 2.7 hours after assembly time. The curing rate is recorded in psi at the elapsed time.

EXAMPLE 11

A sealant comprising the prepolymer of Example 1 was formulated with a quaternary ammonium hydroxide accelerator into a sealant composition suitable for fast room temperature curing.

As in Example 10, 61.62 parts of the prepolymer of Example 1 and 0.34 part of dibutyltin diacetate were combined in a planetary mixer and mixed prior to addition of 2.80 g of N-(beta-aminoethyl)-gamma-aminopropyl trimethoxysilane, 0.62 part of tris-(dimethylaminomethyl)phenol as an optional catalyst, 2.90 parts of xylene, and 2.58 parts of benzyltrimethylammonium hydroxide (40 percent in methanol).

After a further 20 minutes of mixing, 14.57 parts of dried carbon black and 14.57 parts of dried clay were added to the mixture and the formulation was again mixed under a reduced pressure of 19 inches of mercury for 20 minutes.

The sealant compounded in this manner was non-sagging. The curing rate in the aforementioned quick adhesion test was 77.0 psi measured 2.7 hours after assembly, compared with a curing rate of 36.0 psi for substantially the same material not containing the quaternary ammonium hydroxide accelerator.

The lap shear strength of the composition was tested by bonding two primed glass plates, each 1"×5"×0.25" with a sealant bead 1" long by ¼" wide by 5/16" high applied from a sealant tube along one of the 1" edges of the glass plates. The glass plates sandwich the sealant and compress its height to ⅛". Samples are allowed to cure at room temperature for seven days and are then separated by pulling in a plane parallel to the plane of the bead. In this test, the sealants of the example developed a lap shear strength of 300–400 psi.

EXAMPLE 12

A further sealant was prepared from the prepolymer of Example 7 as follows using the method of compounding described in Example 10 above.

Namely, 61.28 parts of the prepolymer of Example 7 are first combined with 0.33 parts of dibutyltin diacetate catalyst and thoroughly mixed. Thereafter 3.34 parts of N-(beta-aminoethyl)gamma-aminopropyltrimethoxy silane, 0.61 part of tris-(dimethylaminomethyl)phenol, 2.90 parts of xylene, and 2.56 parts of benzyltrimethylammonium hydroxide (40 percent in methanol) are added and mixing is continued for a further 20 minutes.

Finally, 14.49 parts of dried carbon black and 14.49 parts of dried clay are added and the resulting mixture is again mixed for 20 minutes under partial vacuum.

The resulting sealant did not sag. Curing, as measured by the quick adhesion test for the sealant, was an average of 74.0 psi 2.7 hours after assembly. The beads of the sealant laid on glass developed adhesion in seven days at room temperature.

EXAMPLE 13

A sealant was prepared from the prepolymer of Example 1 using N-(beta-aminoethyl), N'-(gamma-trimethoxysilyl propyl)-ethylene diamine as a crosslinking agent and the method of compounding described in Example 10 above. 66.40 parts of the prepolymer of Example 1 were thoroughly mixed with 0.34 part of dibutyltin diacetate catalyst. Then, a mixture of 1.13 parts of N-(beta-aminoethyl), N'-(gamma-trimethoxysilyl propyl)-ethylene diamine, 1.51 parts of benzyltrimethylammonium hydroxide (40 percent in methanol), 1.36 parts of dried methanol, and 2.76 parts of dried toluene was added and mixing was continued for another 20 minutes. Finally 13.25 parts of dried carbon black and 13.25 parts of dried clay were added and the whole mixture was again mixed for 20 minutes under vacuum. The curing rate of the sealant so prepared, as measured by the quick adhesion test, was an average of 127 psi 3.5 hours after assembly.

What is claimed is:

1. The method of making a moisture-curable silicon terminated polymer which comprises reacting a polyurethane prepolymer having terminal active hydrogen atoms with an isocyanato organosilane having a terminal isocyanate group and at least one hydrolyzable alkoxy group bonded to silicon.

2. A method as in claim 1 wherein said isocyanato organosilane has from one to three hydrolyzable alkoxy groups bonded to silicon.

3. A method as in claim 1 wherein said isocyanato organosilane is a compound of the formula

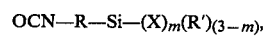

$$OCN-R-Si-(X)_m(R')_{(3-m)},$$

wherein R is a divalent organic radical, R' is hydrogen or alkyl having 1 to 4 carbon atoms, X is an hydrolyzable alkoxy group having from 1 to 4 carbon atoms, and m is an integer from 1 to 3.

4. A method as in claim 1 wherein said isocyanato organosilane having at least one hydrolyzable alkoxy group bonded to silicon is gamma-isocyanatopropyl triethoxysilane.

5. A moisture-curable silicon terminated organic polymer made by the method of claim 4.

6. A method as in claim 1 wherein said polyurethane prepolymer has terminal —OH, —SH, or —NH$_2$ groups.

7. A method as in claim 1 wherein said polyurethane prepolymer has terminal —OH groups and is prepared by reacting an excess of a polyol with an organic polyisocyanate.

8. A method as in claim 7 wherein said polyol is a polyether polyol.

9. A method as in claim 8 wherein said polyether polyol is a polyether diol.

10. A method as in claim 9 wherein said polyether diol is a polyoxyalkylene diol.

11. A method as in claim 8 wherein said polyether polyol is a mixture of a polyether diol and a polyether triol.

12. A method as in claim 11 wherein said polyether diol is a polyoxyalkylene diol and said polyether triol is a polyoxyalkylene triol.

13. A method as in claim 1 wherein said polyurethane prepolymer has terminal —OH groups and also has urea groups within the polymer chain and is prepared by reacting an excess of a mixture of a polyol and water with an organic polyisocyanate.

14. A method as in claim 13 wherein up to 25 percent of the total hydroxyl equivalents in said mixture are present in said water.

15. A method as in claim 7 wherein said polyol is a polyester polyol.

16. A method as in claim 15 wherein said polyester polyol is a polyester diol.

17. A method as in claim 16 wherein said polyester diol is a polyalkanolactone diol.

18. A moisture curable silicon terminated organic polymer made by the method of claim 1.

19. A moisture-curable sealant composition comprising a moisture curable silicon terminated organic polymer as in claim 18 in combination with at least one filler.

20. A sealant composition as in claim 19 which additionally comprises a curing catalyst for said silicon terminated organic polymer.

21. A sealant composition as in claim 20 wherein said catalyst is a quaternary ammonium hydroxide.

22. A sealant composition as in claim 21 wherein said catalyst is benzyltrimethylammonium hydroxide.

23. A sealant composition as in claim 19 which additionally comprises an amino organosilane having at least one hydrolyzable alkoxy group bonded to silicon.

24. A sealant composition as in claim 23 wherein said amino organosilane is N-(beta-aminoethyl)-gamma-aminopropyltrimethoxy silane.

25. A sealant composition as in claim 23 wherein said amino organosilane is N-(beta-aminoethyl),N'-(gamma-trimethoxysilyl propyl)-ethylene diamine.

* * * * *